US011244236B2

(12) United States Patent
Krauss

(10) Patent No.: US 11,244,236 B2
(45) Date of Patent: Feb. 8, 2022

(54) ENTITY RESOLUTION FOR THE INTERNET OF THINGS

(71) Applicant: International Business Machines Corporation, Armonk, NY (US)

(72) Inventor: Kirk J. Krauss, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 924 days.

(21) Appl. No.: 15/476,291

(22) Filed: Mar. 31, 2017

(65) Prior Publication Data

US 2018/0285755 A1 Oct. 4, 2018

(51) Int. Cl.
*G06N 5/04* (2006.01)

(52) U.S. Cl.
CPC .................... *G06N 5/046* (2013.01)

(58) Field of Classification Search
CPC .................................... G06N 5/046
See application file for complete search history.

(56) References Cited

U.S. PATENT DOCUMENTS

| 10,643,609 B1* | 5/2020 | Pogue | G10L 25/51 |
| 2007/0239648 A1* | 10/2007 | Thota | G06F 40/143 |
| | | | 706/47 |
| 2014/0278210 A1* | 9/2014 | Krauss | G01B 21/06 |
| | | | 702/150 |
| 2015/0039611 A1* | 2/2015 | Deshpande | G06F 16/285 |
| | | | 707/737 |
| 2015/0098565 A1 | 4/2015 | Jonas | |
| 2015/0101061 A1* | 4/2015 | Jonas | H04L 9/0872 |
| | | | 726/26 |
| 2016/0196820 A1 | 7/2016 | Williams et al. | |
| 2016/0210317 A1 | 7/2016 | Krauss | |

OTHER PUBLICATIONS

Cecchin, Frantchesco, Cristina Dutra de Aguiar Ciferri, and Carmem Satie Hara. "XML data fusion." International Conference on Data Warehousing and Knowledge Discovery. Springer, Berlin, Heidelberg, 2010. (Year: 2010).*

(Continued)

*Primary Examiner* — Michael J Huntley
*Assistant Examiner* — Sehwan Kim
(74) *Attorney, Agent, or Firm* — L. Jeffrey Kelly

(57) ABSTRACT

An embodiment of the invention provides a method for determining relationships between physical entities, where one or more of the physical entities is associated with static feature(s) and changeable feature(s). An entity analytics engine determines that a first physical entity and a second physical entity may be in a relationship with a third physical entity based on a first rule and a first set of observations. The first rule is applicable to one or more static features of the first physical entity, the second physical entity, and the third physical entity. The first rule provides that the first physical entity and the second physical entity may be in a relationship with the third physical entity when the third physical entity includes one or more static features that are within a threshold degree of similarity to static features of the first physical entity and the second physical entity.

20 Claims, 5 Drawing Sheets

(56) References Cited

OTHER PUBLICATIONS

Zhou, Li, and George Hripcsak. "Temporal reasoning with medical data—a review with emphasis on medical natural language processing." Journal of biomedical informatics 40.2 (2007): 183-202. (Year: 2007).*
Ferrara et al., Data Linking for the Semantic Web, pp. 1-35.
Balakrishnan et al., Aspect Oriented Middleware for Internet of Things: A State-of-the Art Survey of Service Discovery Approaches, International Journal of Intelligent Engineering & Systems, Nov. 4, 2015, vol. 8, VIT University, Vellore, Tamil Nadu, India, pp. 1-13.
Wikipedia, Internet of Things, retrieved from the Internet on Feb. 12, 2017 <URL: https://en.wikipedia.org/wiki/Internet_of_things>, pp. 1-26.
Wikipedia, Record Linkage, retrieved from the Internet on Feb. 12, 2017 <URL: https://en.wikipedia.org/wiki/Record_linkage#Identity_resolution>, pp. 1-9.
Wikipedia, Knowledge extraction, retrieved from the Internet on Feb. 12, 2017 <URL: https://en.wikipedia.org/wiki/Knowledge_extraction#Input_data>, pp. 1-6.
Wikipedia, Data stream mining, retrieved from the Internet on Feb. 12, 2017 <URL: https://en.wikipedia.org/wiki/Data_stream_mining>, pp. 1-5.
Wikipedia, Concept drift, retrieved from the Internet on Feb. 12, 2017 <URL: https://en.wikipedia.org/wiki/Concept_drift>, pp. 1-6.
Schapire, Rob, Machine Learning Algorithms for Classification, retrieved from the Internet on Feb. 12, 2017 <URL: www.cs.princeton.edu/%7Eschapire/talks/picasso-minicourse.pdf>, pp. 1-92.
Altowim, Yasser, Progressive Approach to Relational Entity Resolution, retrieved from the Internet on Feb. 12, 2017 <URL: http://www.vldb.org/pvldb/vol7/p999-altowim.pdf>, pp. 1-12.
Quora, "All these Machine learning algorithms, what is the point? It seems like choice of machine learning algorithm, decision tree, neural net, svm, isn't nearly important as the feature selection and feature extraction process which determines what goes in to it, garbage in garbage out, that sort of thing", Accessed on Apr. 22, 2020, 5 pages.
www.iot-a.eu/public/public-documents/d1.5/at_download/file, Internet of Things—Architecture IoT-A Deliverable D1.5—Final architectural reference model for the IoT v3.0', IoT-A (257521), Contractual Delivery Date: May 31, 2013, 482 pages.

* cited by examiner

ENTITY RESOLUTION FOR THE INTERNET OF THINGS

FIELD OF THE INVENTION

The present invention relates to systems, methods, and computer program products for entity resolution for the Internet of Things.

BACKGROUND

The Internet of Things has a variety of different solutions from different vendors, targeting a variety of different real world problem spaces. Given its breadth, the Internet of Things landscape appears as highly fragmented because typically applications appear as vertical silos only, and for any such typical application, the number and richness of functional components belonging to the system and their interaction patterns lets one appreciate the system complexity. Entity resolution provides a means for discovering identity matches and non-obvious relationships across multiple data silos.

SUMMARY OF THE INVENTION

An embodiment of the invention provides a method for determining relationships between physical entities, where one or more of the physical entities are associated with one or more static features and one or more changeable features. An entity analytics engine determines that a first physical entity and a second physical entity may be in a relationship with a third physical entity based on a first rule and a first set of observations. The first rule is applicable to one or more static features of the first physical entity, the second physical entity, and the third physical entity. The first rule provides that the first physical entity and the second physical entity may be in a relationship with the third physical entity when the third physical entity includes one or more static features that are within a threshold degree of similarity to static features of the first physical entity and the second physical entity.

The entity analytics engine determines whether the first physical entity is in a relationship with the third physical entity based on a second rule and a second set of observations, wherein the second rule is applicable to one or more changeable features of the first physical entity. The second rule provides that the first physical entity is in a relationship with the third physical entity when one or more changeable features of the first physical entity fit one or more characteristics of the third physical entity. The second rule provides that the first physical entity is not in a relationship with the third physical entity when one or more changeable features of the first physical entity are in conflict with one or more characteristics of the third physical entity.

The entity analytics engine determines that the second physical entity is in a relationship with the third physical entity based on a third rule and a third set of observations, where the third rule is applicable to one or more changeable features of the second physical entity. The third rule provides that the second physical entity is in a relationship with the third physical entity when one or more changeable features of the second physical entity fit one or more criteria associated with the third physical entity. The third rule provides that the second physical entity is not in a relationship with the third physical entity when one or more changeable features of the second physical entity are in conflict with one or more criteria associated with the third physical entity.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
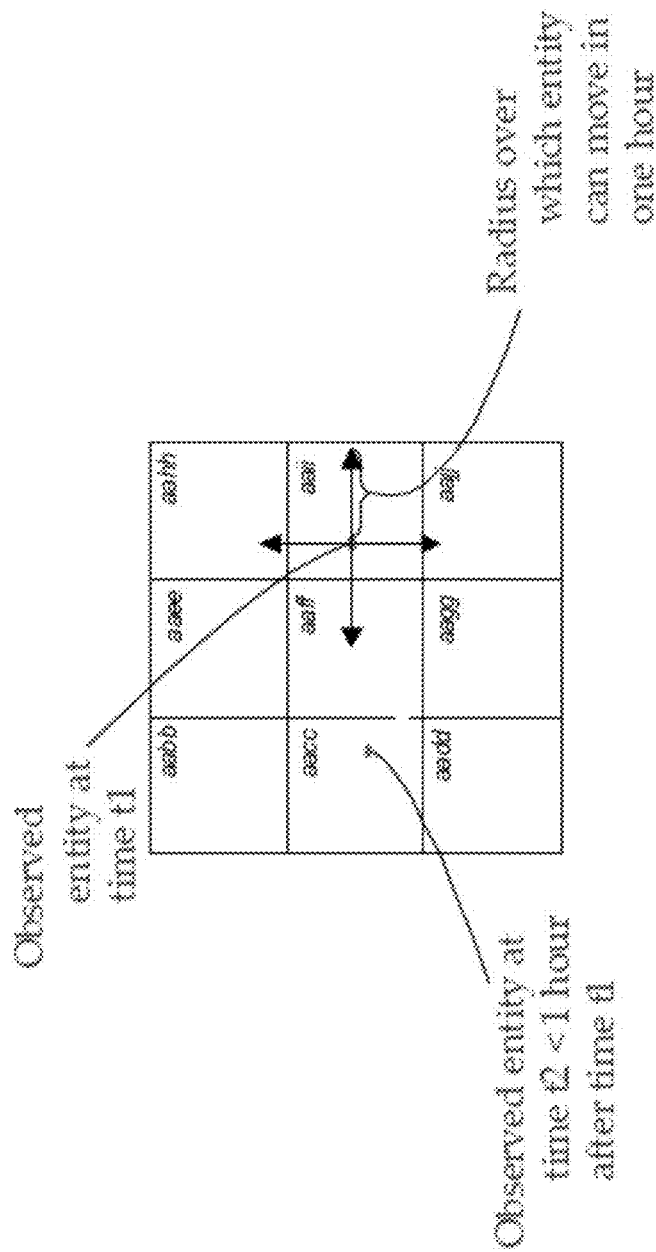
FIG. 1 is a diagram illustrating movement of an entity according to an embodiment of the present invention.

Exemplary, non-limiting embodiments of the present invention are discussed in detail below. While specific configurations are discussed to provide clear representations of the invention, it should be understood that the disclosed configurations are provided for illustration purposes only. A person of ordinary skill in the art will recognize that other configurations may be used without departing from the spirit and scope of the invention.

At least one embodiment of the invention provides an entity analytics systems configured to determine relationships between entities, such as "is a" or "is related to a" relationships. An "is a" relationship can exist between two observed entities if the observations reflect an identical entity (i.e., two observations refer to the same entity). Using a ship tracking system as an example, if two observations of oceangoing vessels reflect common positions, crew members, tonnage, registration numbers, etc., the system can determine that there is a 1:1 relationship (i.e., an "is a" relationship) between the two entities. An "is related to a" relationship can exist between two observed entities if the observations reflect sufficiently common characteristics, but not an exact match. Again, using a ship tracking system as an example, an "is related to" relationship exists between entities, for example, if two observed entities have similar tonnages, but different positions, crew members, etc.

The entity analytics system can be configured to determine "is a" and "is related to a" relationships between different entities using an entity/feature/feature element model. In the entity/feature/feature element model, an entity may have one or more features, and each feature may have a set of pre-defined elements. Using a ship tracking system as an example, the entity itself may be a ship. The ship may have a plurality of features, such as ship size, crew membership, identification, and so on. The ship size feature could have feature elements corresponding to the maximum tonnage, volume, and so on. The crew membership feature could have feature elements corresponding to specific positions or roles on the ship (e.g., captain, helmsman, navigator, etc.). The identification feature could have feature elements corresponding to a registration number, port of registry, and so on.

At least one embodiment of the invention provides a system that performs entity resolution/entity relationship determination based on multiple sets of rules in a two-phase commit sequence per resolution/determination. The system can enable entity resolution based on a combination of both static and time-varying (behavioral) factors, codified as rules applicable to the entities.

In at least one embodiment of the invention, physical entities are resolved, and relationships are identified, via a multi-phase commit process. That is, entity resolution (the identification of observations that represent an identical entity) and entity relationship determination (the identification of other, non-identity relationships among entities) can occur in multiple phases for a given entity.

The method can include three phases. In Phase 1, an entity is initially observed. Tentative entity resolution can be performed based on characteristics that are static, or relatively static (e.g., entity features or feature elements, such as an identification number, an address, a height, etc.) as determined via Phase 1 rules. In Phase 2, further observations arrive prior to committed resolution/relationship determination. Behavior data can be collected to affirm or negate tentative resolutions. Entities that have been tentatively resolved in Phase 1 can be un-tentatively-resolved based on behavior characteristics as determined via Phase 2 rules. That is, if according to Phase 1 rules pertinent to static, or relatively static, behavior, two observed entities have been determined to be identical, and if according to Phase 2 rules pertinent to more changeable behavior the entities cannot be identical, then the tentative Phase 1 entity resolutions can be reverted. Thus, if for example an automobile observed via a first data source shares an identification number with an aircraft observed via a second data source, the Phase 1 rules may result in a tentative resolution, but the Phase 2 rules may result in reversion of the tentative resolution. In this example, the Phase 2 rules may consider entity behavior, such as when the tentatively resolved entity as observed via the second data source to behave unlike an automobile, for example, by moving at 200 kilometers per hour over open water.

In Phase 3, based on determination by an observation count per tentatively resolved entity, a timeout, or one or more other criteria, tentative resolutions/relationship determinations can be committed based on Phase 3 rules.

In some implementations, Phase 2 rules and Phase 3 rules may be the same. Rules can be arranged to allow for extensible configuration. There may be no need for outboard motion (or other outboard physically-oriented) processing. For example, if an entity is changing color, then that changeability can be an entity feature or feature element that can be considered by Phase 2 or Phase 3 rules. An entirely in-memory implementation may be more suitable for this style of entity resolution than conventional database-oriented systems. The in-memory entity resolution engine can be distributed across a clustered/cloud-based environment for scalability. A Phase 3 rule can trigger a committed resolution directly, or it can produce a static feature or feature element. This may indicate that the conditions of the rule have been met for use in further resolutions amenable to Phase 1 rules. For the purposes of this disclosure, either features or feature elements, as considered by the entity/feature/feature element model, may be subject to any of the Phase 1, Phase 2, and Phase 3 rules and are collectively characterized as "features" herein.

Physical entities can undergo various changes over time. For example, a leaf can change color, within a certain range of colors. A car can be washed, consuming water within a certain range of quantities. A boat can travel a certain distance at a certain velocity. Any of the above behaviors can be treated as entity features subject to rules.

Rules can determine, for instance, how far an entity can legitimately move within a time quantum. Incoming observations can be associated with spatial coordinates for an entity as well as timestamps at which the entity is observed. The entity resolution engine can track tentatively-resolved entities as moving, over time, according to inbound observations associated with varying coordinates and timestamps. A Phase 2 rule can apply to the entity. If the entity moves further, over time, than is allowed by the Phase 2 rule, then the entity is un-tentatively-resolved.

FIG. 1 is a diagram illustrating movement of observed entities according to an embodiment of the invention. A first observation places a first entity in spatial quantum aaii at time t1. For example, if according to a Phase 2 rule, an entity of that class cannot move all the way across adjacent quantum aaff within an hour, and if within an hour a second observation of an entity that has been tentatively resolved as identical to the first entity places it beyond that adjacent quantum, then the tentative resolution can be considered moot and the entities that have been observed in these quanta are left as unresolved first and second entities. This might also be a case where the resolution rules applicable to static features need to be revisited, to prevent improper resolutions. The Phase 2 rule could trigger a message that would indicate revisiting those static rules. Phase 3 rules can be rules by which entities are resolved, or by which other relationships are determined, based on time-varying features. Sophisticated determinations can be made based strictly on rules.

In various embodiments, the rules used for making sophisticated determinations can be based on various algorithms such as motion processing heuristics, machine learning algorithms or systems, statistical analyses, or other techniques applicable to the analysis of changes observed with respect to one or more physical entities over a time period. A Phase 2 or Phase 3 rule can trigger the processing of one or more algorithms that can employ any of these techniques to definitively determine whether the behavior of one or more physical entities fits with tentative determinations made via the Phase 1 rules applicable to the static properties of the physical entities. By applying the algorithms, an embodiment of the invention, such as a prior art entity analytics system enhanced to incorporate the invention, can definitively determine entity relationships, or in the alternative, can overturn tentative determinations, based on the observed behavior of the physical entities. The relationships that can be definitively determined can include both identity relationships (i.e. two observations can be definitively determined to reflect an identical physical entity) or other relationships (i.e. two observations can be definitively determined to reflect a relationship other than identity between the observed physical entities). In some embodiments, the time frame that an algorithm can consider, in making a definitive determination based on entity behavior, can be incorporated into the algorithm itself. In other embodiments, the time frame can be provided to the algorithm as an aspect of a rule. In still other embodiments, the time frame can be configurable separately from any rule description, for example via a configuration file, a user-accessible setting, or the like. A Phase 2 or Phase 3 rule can operate on observational data as it arrives from one or more data sources in real time, or such a rule can be brought to bear on a time-stamped data set collected in advance of ingestion of the data from the data sources into a system or computer program product in which the invention is embodied.

The algorithms that can be invoked in making definitive determinations based on Phase 2 or Phase 3 rules can comprise not only motion processing algorithms but also algorithms related to any physical parameters. In some embodiments, the algorithms can be based on mathematical formulas, ratio calculations, or determinations of physical ranges, or regions, or sets of regions. Examples of physical ranges can include ranges of size/weight ratios defined by criteria such as a minimum and maximum volume per unit weight, or a range of temperatures or pressures defined by criteria such as a minimum and maximum temperature or pressure, or a range of rates of consumption defined by criteria such as minimal and maximal milligrams per kilogram per hour, or other ranges defined by other criteria. In some embodiments, the criteria can reflect multiple ranges. The multiple ranges can reflect, for example, a set of temperature and pressure ratios at which a device can properly function, or for another example, a set of depths to which a drilling rig may collect samples of soil, based on a related set of degrees of soil hardness. In some embodiments, the criteria that an algorithm can consider, in making a definitive determination based on entity behavior, can be incorporated into the algorithm itself. In other embodiments, the criteria can be provided to the algorithm as an aspect of a rule. In still other embodiments, the criteria can be configurable separately from any rule description, for example via a configuration file, a user-accessible setting, or the like. The examples of algorithms and related criteria provided herein are intended to illustrate some capabilities made possible by the invention and are not intended to be limiting as to the scope of the invention.

Figure 2:
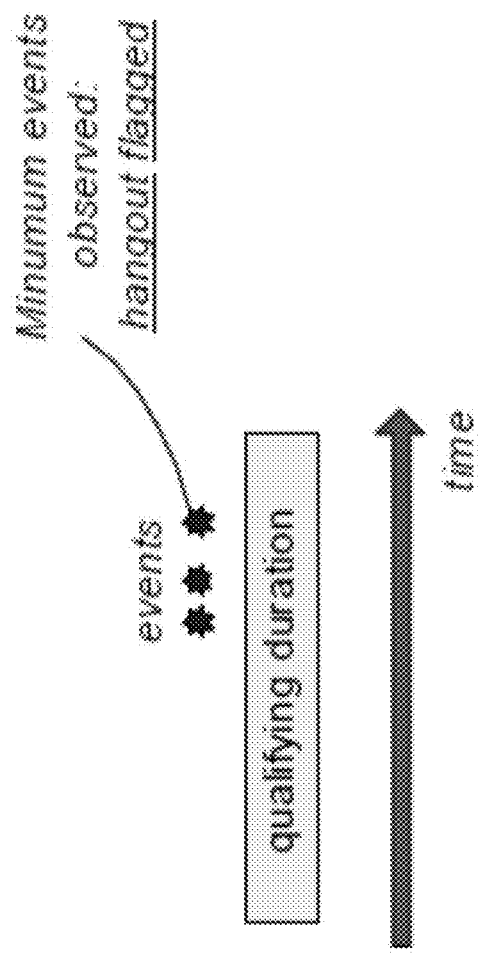
FIG. 2 is a diagram illustrating events over time according to an embodiment of the present invention.

In at least one embodiment of the invention, the type of observation termed a hangout is flagged, when an entity is observed in a certain spatial quantum on a certain number of occasions over a certain time interval. As illustrated in FIG. 2, the interval may be known as the qualifying duration.

In at least one embodiment, an entity resolution engine that implements the method need not rely on outboard logic to detect hangouts, or other time-dependent behavior relevant to entity analytics. Rather, a Phase 3 rule can indicate that a relationship determination is made based on an observation count. Further, a time interval can be applied as part of a Phase 3 rule. The hangout can be characterized as a feature of an entity that is found to be hanging out according to the rule. Entity relationships also can be determined based on a similar Phase 3 rule that can indicate that different entities are observed within a certain spatial proximity within a certain interval.

The logic for detecting a wide range of behavior changes over time can work similarly to the logic outlined above for detecting hangouts. When such time-dependent logic is rule-driven, and given any suitable parameters, the logic can perform more than hangout detection alone. The logic can apply to any entity feature, not just to mere spatial locations. For example, a Phase 3 rule may indicate when an entity has changed its direction of travel on a certain number of occasions over an interval. An aircraft that keeps changing direction, for instance, may be in trouble. A Phase 3 rule applied to color changes can indicate when a device is overheating. Applied to plant growth, the Phase 3 rule can indicate or help forecast an appropriate date for harvest. Applied to electric generators, fuel cells, motors, and the like, the Phase 3 rule can indicate a dangerous condition. The possibilities go on and on.

In at least one embodiment, the system and methods herein provide an improvement in computer technology by making the entity resolution engine flexible enough to consider the behavior of physical entities over time by extending the existing paradigm via which the entity resolution engine is configured, rather than forcing an administrator to learn new configurations or programming techniques (e.g., how to choose a machine learning algorithm to analyze data subject to concept drift, how to create a plug-in module for programmatic behavior analysis, or some other kludged-together solution).

Figure 3:
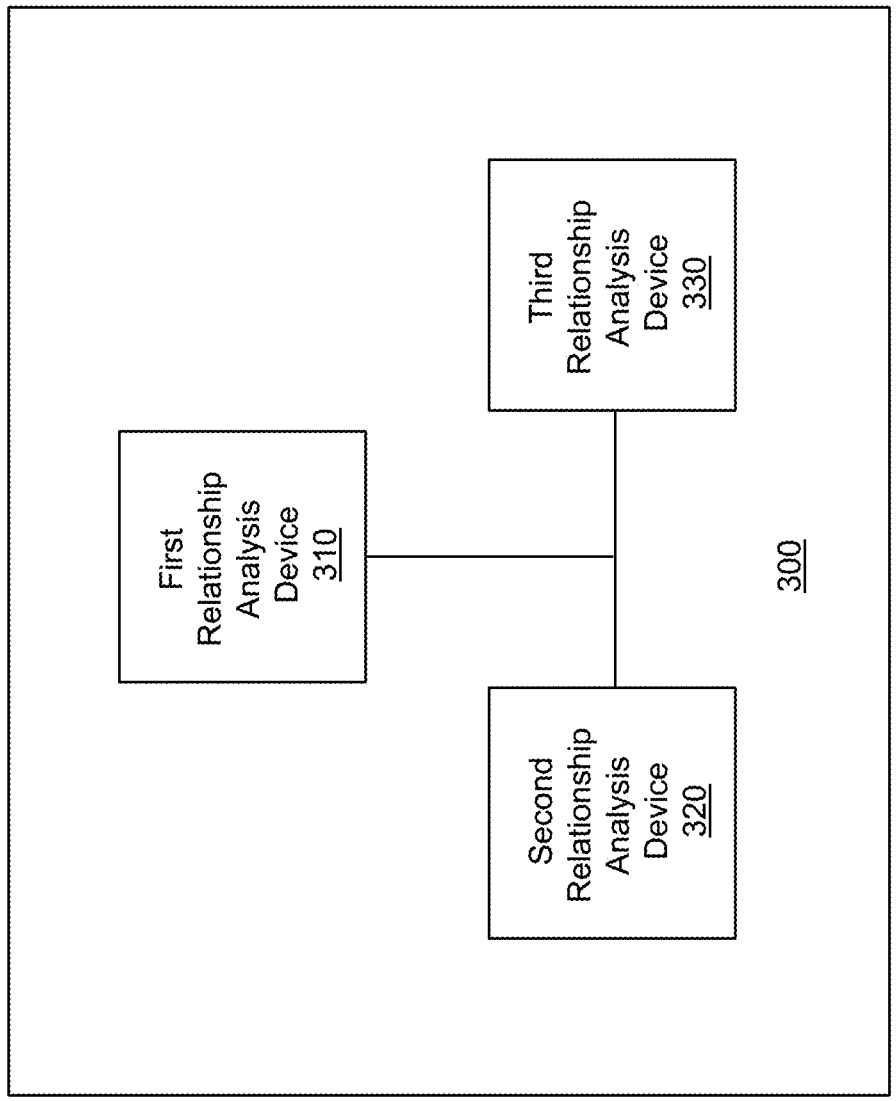
FIG. 3 illustrates a system for determining relationships between physical entities according to an embodiment of the present invention.
Figure 4:
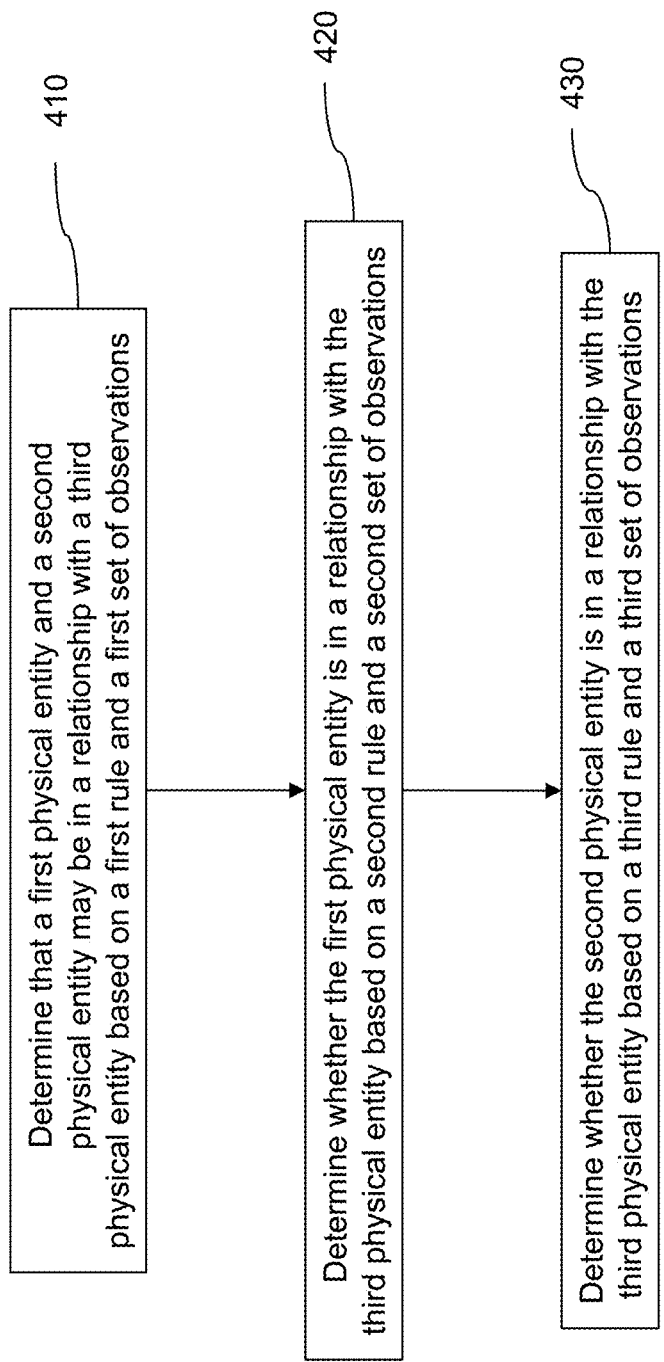
FIG. 4 is a flow diagram illustrating a method for determining relationships between physical entities according to an embodiment of the present invention.

FIG. 3 illustrates a system 300 for determining relationships between physical entities according to an embodiment of the invention. FIG. 4 is a flow diagram illustrating a method for determining relationships between physical entities according to an embodiment of the invention (e.g., using the system 300). One or more physical entities can be associated with one or more static features and one or more changeable features.

A first relationship analysis device 310 (also referred to herein as the entity analytics engine) can determine that a first physical entity and a second physical entity may be in a relationship with a third physical entity based on a first rule and a first set of observations 410. The relationship can be an identity relationship. The first rule can be applicable to one or more static features of the first physical entity, the second physical entity, and the third physical entity. In at least one embodiment, the first rule does not include changeable features of entities.

The first rule can provide that the first physical entity and the second physical entity may be in a relationship with the third physical entity when the third physical entity includes one or more static features that are within a threshold degree of similarity to static features of the first physical entity and the second physical entity. The first rule can factor only static features of the first physical entity, static features of the second physical entity, and/or static features of the third physical entity. The first rule can be a Phase 1 rule as referred to herein.

A second relationship analysis device 320 (also referred to herein as the entity analytics engine) can determine whether the first physical entity is in a relationship with the third physical entity based on a second rule and a second set of observations 420. The second rule can be applicable to one or more changeable features of the first physical entity. In at least one embodiment, the second rule does not include static features of the first physical entity. The second set of observations can occur after the first set of observations.

The second rule can provide that the first physical entity is in a relationship with the third physical entity when one or more changeable features of the first physical entity fits one or more characteristics of the third physical entity. The second rule can provide that the first physical entity is not in a relationship with the third physical entity when one or more changeable features of the first physical entity is in conflict with one or more characteristics of the third physical entity. The second rule can be a Phase 2 rule as referred to herein.

A third relationship analysis device 330 (also referred to herein as the entity analytics engine) can determine whether the second physical entity is in a relationship with the third physical entity based on a third rule and a third set of observations 430. The third rule can be applicable to one or more changeable features of the second physical entity. In at least one embodiment, the third rule does not include static features of the second physical entity. The third set of observations can occur after the second set of observations.

The third rule can provide that the second physical entity is in a relationship with the third physical entity when one or more changeable features of the second physical entity fits one or more criteria associated with the third physical entity. The third rule can provide that the second physical entity is not in a relationship with the third physical entity when one or more changeable features of the second physical entity is in conflict with one or more criteria associated with the third physical entity. The third rule can be a Phase 3 rule as referred to herein.

The first relationship analysis device 310, the second relationship analysis device 320, and the third relationship analysis device 330 can be separate processors connected to one another in a hardware system. In another embodiment, the first relationship analysis device 310, the second relationship analysis device 320, and the third relationship analysis device 330 are positioned on a single processor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
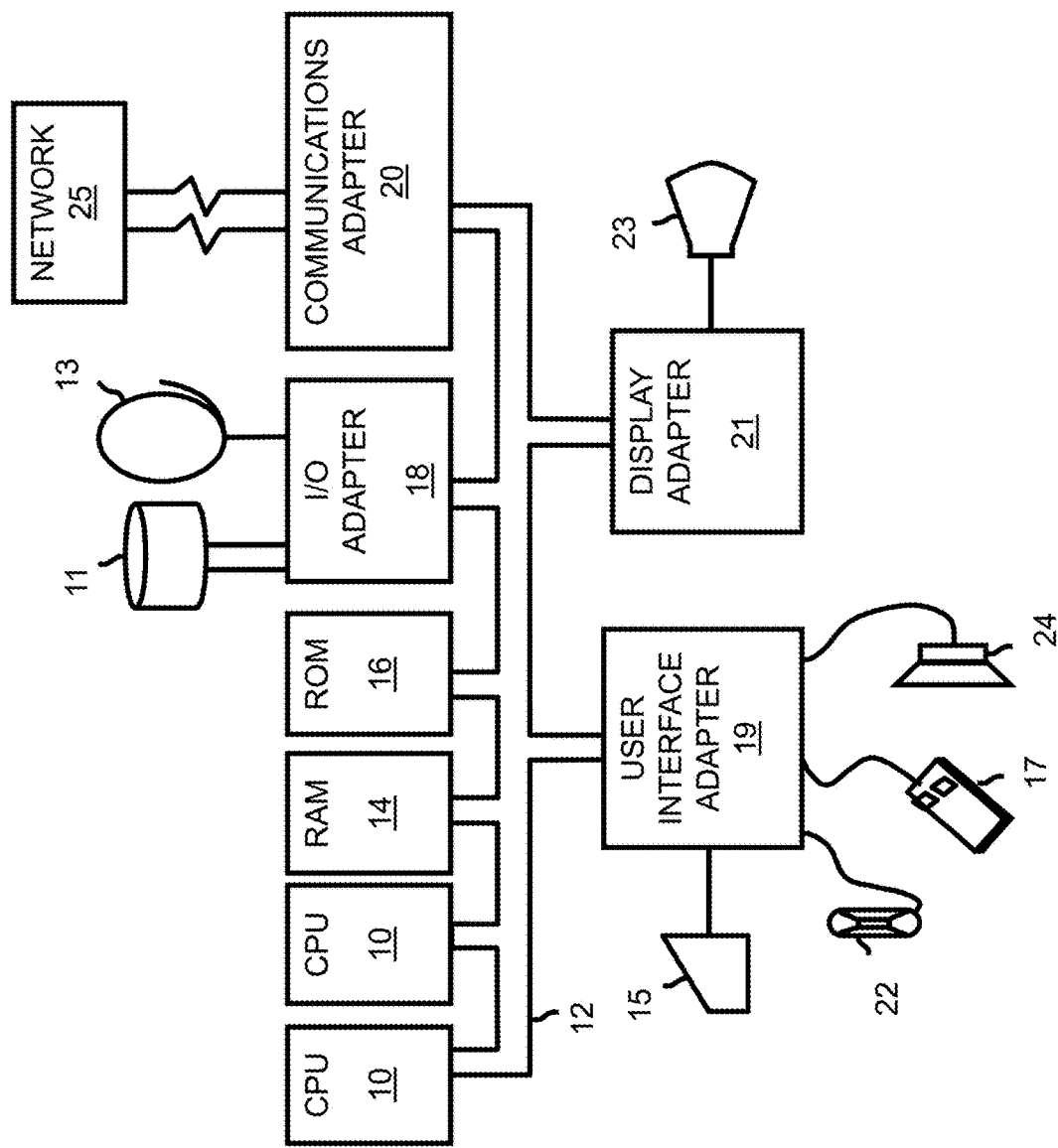
FIG. 5 is a diagram illustrating a computer program product for determining relationships between physical entities according to an embodiment of the present invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for processing data representing observations of physical entities, said method comprising:

receiving a set of rules for processing data representing observations of physical entities;

receiving, from one or more data sources, one or more data sets representing one or more observations of each of a first physical entity, a second physical entity, and a third physical entity;

determining a first rule in the set of rules and a second rule in the set of rules, wherein the set of rules include first time-varying, second time-varying, third time-varying, fourth time-varying, fifth time-varying, and sixth time-varying changeable features, time-varying changeable features are determined based on motion processing heuristics, machine learning algorithms or systems and statistical analyses with respect to one or more physical entities over a time period between a time t1 and a time t2, wherein the time t2 is one hour after the time t1, wherein the first time-varying changeable feature is a change of color within a certain range of colors within the time period between the time t1 and the time t2, the second time-varying changeable feature is a change in quantities of substances within a certain range within the time period between the time t1 and the time t2, the third time-varying changeable feature is a change in a distance within the time period between the time t1 and the time t2, the fourth time-varying changeable feature is a change in velocity and direction of travel of the first physical entity within the time period between the time t1 and the time t2, a change in velocity and direction of travel of the second physical entity within the time period between the time t1 and the time t2, and a change in velocity and direction of travel of the third physical entity within the time period between the time t1 and the time t2, the fifth time-varying changeable feature is a change in physical size, physical weight and temperature within the time period between the time t1 and the time t2, and the sixth time-varying changeable feature is a change in rate of consumption within the time period between the time t1 and the time t2;

based on the first rule in the set of rules applied to the one or more data sets, tentatively determining that the first physical entity and the second physical entity are in a relationship with the third physical entity, based on the second rule in the set of rules, applying a first algorithm and a second algorithm to the one or more data sets, wherein the first rule and the second rule are applied based on the first algorithm and the second algorithm to the one or more data sets as the data sets arrive from the one or more data sources in real-time to determine a non-identity relationship, or the first rule and the second rule are brought to bear on a time-stamped data set collected in advance of ingestion of the data from the one or more data sources, wherein the first algorithm and the second algorithm comprise motion processing algorithms, algorithms related to any physical parameters and algorithms based on mathematical formulas, ratio calculations or determinations of physical ranges, or regions, or sets of regions;

based on the applying of the first algorithm, definitively determining that the first physical entity is not in a relationship with the third physical entity;

based on the applying of the second algorithm, definitively determining that the second physical entity is in a relationship with the third physical entity; and storing one or more representations of the definitively determining that the second physical entity is in a relationship with the third physical entity as data accessible via at least one of the one or more data sources.

2. The method according to claim 1, wherein the first rule provides that the first physical entity and the second physical entity are in a tentative relationship with the third physical entity when the third physical entity includes a threshold number of static features that are within a threshold degree of similarity to static features of the first physical entity and the second physical entity.

3. The method according to claim 1, wherein the first rule does not include changeable features of entities.

4. The method according to claim 1, wherein the first rule only factors static features of the first physical entity, static features of the second physical entity, and static features of the third physical entity.

5. The method according to claim 1, wherein the second rule provides that the first physical entity is not in a relationship with the third physical entity when at least one changeable feature of the first physical entity is in conflict with at least one characteristic of the third physical entity.

6. The method according to claim 1, wherein the second rule does not include static features of the first physical entity.

7. The method according to claim 1, wherein a third rule provides that the second physical entity is in a relationship with the third physical entity when at least one changeable feature of the second physical entity fits one or more criteria associated with the third physical entity.

8. The method according to claim 1, wherein a third rule does not include static features of the second physical entity.

9. The method according to claim 1, wherein the relationship is an identity relationship.

10. The method according to claim 1, wherein the second set of observations occurs after the first set of observations.

11. The method according to claim 1, wherein the third set of observations occurs after the second set of observations.

12. The method according to claim 1, wherein the second rule provides that the first physical entity is in a relationship with the third physical entity when at least one changeable feature of the first physical entity fits one or more characteristics of the third physical entity, and
wherein a third rule provides that the second physical entity is not in a relationship with the third physical entity when at least one changeable feature of the second physical entity is in conflict with at least one criteria associated with the third physical entity.

13. The method according to claim 1, wherein a result of the tentatively determining that the first physical entity and the second physical entity are in a relationship with the third physical entity is confirmed by a third rule and a third set of observations.

14. A method for determining relationships between physical entities, wherein at least one physical entity is associated with at least one static feature and at least one changeable feature, said method comprising:
determining a first rule in a set of rules and a second rule in the set of rules, wherein the set of rules include first time-varying, second time-varying, third time-varying, fourth time-varying, fifth time-varying, and sixth time-varying, changeable features, time-varying changeable features are determined based on motion processing heuristics, machine learning algorithms or systems and statistical analyses with respect to one or more physical entities over a time period between a time t1 and a time t2, wherein the time t2 is one hour after the time t1,
wherein the first time-varying changeable feature is a change of color within a certain range of colors within the time period between the time t1 and the time t2,
the second time-varying changeable feature is a change in quantities of substances within a certain range within the time period between the time t1 and the time t2,
the third time-varying changeable feature is a change in a distance within the time period between the time t1 and the time t2,
the fourth time-varying changeable feature is a change in velocity and direction of travel of the first physical entity within the time period between the time t1 and the time t2, a change in velocity and direction of travel of the second physical entity within the time period between the time t1 and the time t2, and a change in velocity and direction of travel of the third physical entity within the time period between the time t1 and the time t2,
the fifth time-varying changeable feature is a change in physical size, physical weight and temperature within the time period between the time t1 and the time t2, and
the sixth time-varying changeable feature is a change in rate of consumption within the time period between the time t1 and the time t2;
determining by an entity analytics engine that a first physical entity and a second physical entity may be in a relationship with a third physical entity based on the first rule and a first set of observations; wherein the first rule is applicable to one or more static features of the first physical entity, the second physical entity, and the third physical entity; the first rule providing that the first physical entity and the second physical entity may be in a relationship with the third physical entity when the third physical entity includes one or more static features that are within a threshold degree of similarity to static features of the first physical entity and the second physical entity;
determining by the entity analytics engine whether the first physical entity is in a relationship with the third physical entity based on the second rule and a second set of observations, wherein the second rule is applicable to at least one changeable feature of the first physical entity, wherein the second rule provides that the first physical entity is in a relationship with the third physical entity when at least one changeable feature of the first physical entity fits one or more characteristics of the third physical entity, and wherein the second rule provides that the first physical entity is not in a relationship with the third physical entity when at least one changeable feature of the first physical entity is in conflict with at least one characteristic of the third physical entity, wherein the first rule and the second rule are applied to the one or more data sets as the data sets arrive from the one or more data sources in real-time to determine a non-identity relationship, or the first rule and the second rule are brought to bear on a time-stamped data set collected in advance of ingestion of the data from the one or more data sources, wherein the first rule and the second rule are based on a first algorithm and a second algorithm, wherein the first algorithm and the second algorithm comprise motion processing algorithms, algorithms related to any physical parameters and algorithms based on mathematical formulas, ratio calculations or determinations of physical ranges, or regions, or sets of regions; and
determining by the entity analytics engine that the second physical entity is in a relationship with the third physical entity based on a third rule and a third set of observations, wherein the third rule is applicable to at least one changeable feature of the second physical entity, wherein the third rule provides that the second physical entity is in a relationship with the third physical entity when at least one changeable feature of the second physical entity fits one or more criteria associated with the third physical entity, and wherein the third rule provides that the second physical entity is not in a relationship with the third physical entity when at least one changeable feature of the second physical entity is in conflict with at least one criteria associated with the third physical entity.

15. The method according to claim 14, wherein the first rule does not include changeable features of entities.

16. The method according to claim 14, wherein the first rule only factors static features of the first physical entity, static features of the second physical entity, and static features of the third physical entity.

17. The method according to claim 14, wherein the second rule does not include static features of the first physical entity.

18. The method according to claim 14, wherein the relationship is an identity relationship.

19. The method according to claim 14, wherein the second set of observations occurs after the first set of observations, and
wherein the third set of observations occurs after the second set of observations.

20. A computer program product for determining relationships between physical entities, wherein at least one physical entity includes at least one static feature and at least one changeable feature, said computer program product comprising:
a computer readable storage medium having stored thereon:
first program instructions executable by a device to cause the device determine a first rule in a set of rules and a second rule in the set of rules, wherein the set of rules include first time-varying, second time-varying, third time-varying, fourth time-varying, fifth time-varying, and sixth time-varying, changeable features, time-varying changeable features are determined based on motion processing heuristics, machine learning algorithms or systems and statistical analyses with respect to one or more physical entities over a time period between a time t1 and a time t2, wherein the time t2 is one hour after the time t1,
wherein the first time-varying changeable feature is a change of color within a certain range of colors within the time period between the time t1 and the time t2,
the second time-varying changeable feature is a change in quantities of substances within a certain range within the time period between the time t1 and the time t2,
the third time-varying changeable feature is a change in a distance within the time period between the time t1 and the time t2,
the fourth time-varying changeable feature is a change in velocity and direction of travel of the first physical entity within the time period between the time t1 and the time t2, a change in velocity and direction of travel of the second physical entity within the time period between the time t1 and the time t2, and a change in velocity and direction of travel of the third physical entity within the time period between the time t1 and the time t2,
the fifth time-varying changeable feature is a change in physical size, physical weight and temperature within the time period between the time t1 and the time t2, and
the sixth time-varying changeable feature is a change in rate of consumption within the time period between the time t1 and the time t2;
second program instructions executable by a device to cause the device to determine that a first physical entity and a second physical entity may be in a relationship with a third physical entity based on the first rule and a first set of observations, the first rule only factoring static features of the first physical entity, the second physical entity, and the third physical entity;
third program instructions executable by the device to cause the device to determine that the first physical entity is not in a relationship with the third physical entity based on the second rule a second set of observations, the second rule factoring at least one changeable feature of the first physical entity, wherein the first rule and the second rule are applied to the one or more data sets as the data sets arrive from the one or more data sources in real-time to determine a non-identity relationship, or the first rule and the second rule are brought to bear on a time-stamped data set collected in advance of ingestion of the data from the one or more data sources, wherein the first rule and the second rule are based on a first algorithm and a second algorithm, wherein the first algorithm and the second algorithm comprise motion processing algorithms, algorithms related to any physical parameters and algorithms based on mathematical formulas, ratio calculations or determinations of physical ranges, or regions, or sets of regions; and
fourth program instructions executable by the device to cause the device to determine that the second physical entity is in a relationship with the third physical entity based on a third rule and a third set of observations, the third rule factoring at least one changeable feature of the second physical entity.

* * * * *